US012583115B2

(12) United States Patent
Srivastav et al.

(10) Patent No.: US 12,583,115 B2
(45) Date of Patent: Mar. 24, 2026

(54) ENHANCED VISUAL FEEDBACK SYSTEMS, ENHANCED SKILL LIBRARIES, AND ENHANCED FUNGIBLE TOKENS FOR THE OPERATION OF ROBOTIC SYSTEMS

(71) Applicant: AIVOT, LLC, Seattle, WA (US)

(72) Inventors: Shashwat Srivastav, Seattle, WA (US); Manish Chablani, Seattle, WA (US); Art Min, Seattle, WA (US); Sriram Sankaran, Seattle, WA (US); Igor Medvedev, Seattle, WA (US); Julio Ng, Seattle, WA (US)

(73) Assignee: AIVOT, LLC, Seattle, WA (US)

( * ) Notice: Subject to any disclaimer, the term of this patent is extended or adjusted under 35 U.S.C. 154(b) by 349 days.

(21) Appl. No.: 18/081,560

(22) Filed: Dec. 14, 2022

(65) Prior Publication Data

US 2023/0286157 A1      Sep. 14, 2023

Related U.S. Application Data

(60) Provisional application No. 63/289,538, filed on Dec. 14, 2021.

(51) Int. Cl.
B25J 9/16          (2006.01)
(52) U.S. Cl.
CPC ........... B25J 9/1674 (2013.01); B25J 9/1664 (2013.01); B25J 9/1697 (2013.01)

(58) Field of Classification Search
None
See application file for complete search history.

(56) References Cited

U.S. PATENT DOCUMENTS

| | | | |
|---|---|---|---|
| 2016/0008983 A1* | 1/2016 | Osaka | B25J 9/1692 |
| | | | 700/254 |
| 2018/0272535 A1* | 9/2018 | Ogawa | B25J 9/1692 |
| 2019/0168389 A1* | 6/2019 | Shino | B25J 13/088 |

FOREIGN PATENT DOCUMENTS

| | | | | |
|---|---|---|---|---|
| CA | 1279892 C | * | 2/1991 | B25J 13/088 |

OTHER PUBLICATIONS

A. Kawamura, M. Tachibana, S. Yamate and S. Kawamura, "Encoder-less robot motion control using vision sensor and back electromotive force," 2014 IEEE/RSJ International Conference on Intelligent Robots and Systems (Year: 2014).*

* cited by examiner

*Primary Examiner* — Jason Holloway
*Assistant Examiner* — Bryant Tang
(74) *Attorney, Agent, or Firm* — Foley & Lardner LLP

(57) ABSTRACT

Various aspects of the technology described herein are generally directed to systems, methods, and computer storage media for, among other things, providing robotic system services including implementing an enhanced robotics framework. The enhanced robotics framework includes a visual feedback, a skills library, and minting and awarding a fungible token for activities associated with a robot.

18 Claims, 6 Drawing Sheets

300

302 — PROVIDE AN ENHANCED ROBOTIC ARM COMPRISING A PLURALITY OF JOINTS

304 — PROVIDE A VISUAL FEEDBACK SYSTEM THAT SUPPORTS PROVIDING VISUAL-BASED COURSE CORRECTION BASED ON CONTINUOUSLY CAPTURING SCENE INFORMATION

400

402 RECEIVE AN OBJECT SELECTION AND AN ACTION SELECTION

404 CAUSE DISPLAY OF A SIMULATION ASSOCIATED WITH THE OBJECT SELECTION AND THE ACTION SELECTION

406 RECEIVE INPUT CORRECTING THE SIMULATION ASSOCIATED WITH THE OBJECT SELECTION AND THE ACTION SELECTION

500

502 — CAPTURE A POSITION AND AN ORIENTATION OF AN ENHANCED ROBOTIC ARM

504 — ACCESS VISUAL-BASED FEEDBACK DATA

506 — CORRECT THE POSITION AND THE ORIENTATION OF THE ENHANCED ROBOTIC ARM

ENHANCED VISUAL FEEDBACK SYSTEMS, ENHANCED SKILL LIBRARIES, AND ENHANCED FUNGIBLE TOKENS FOR THE OPERATION OF ROBOTIC SYSTEMS

CROSS REFERENCES

This application claims priority to U.S. Provisional Application No. 62/289,538, filed on Dec. 14, 2021, the contents of which is incorporated herein by reference in its entirety.

BACKGROUND

Robotic systems can generally include design, construction, operation, and user of robots. Robots can be machines designed to help and assist humans. Robots can be used in a variety of situations ranging from dangerous environments to manufacturing processes. Robots can operate based on joints that are movable components of the robot that result in relative motions between adjacent links, where links can be rigid members connecting the joints for preferred operations.

Conventional robotic systems may lack enhanced features and functionality associated with visual feedback, skill libraries, and fungible tokens. For example, conventional robots may operate to provide task demonstrations instead of enhanced UX-based tools for teaching news skills; or a conventional robotic system may have operate based on high precision joints that can be expensive; or operate highly autonomously without sufficient incentives to maintain or improve on autonomous operations. As such, an alternative robotic system, for performing robotic system operations, can improve interfaces and operations in robotic systems.

SUMMARY OF THE INVENTION

Various aspects of the technology described herein are generally directed to systems, methods, and computer storage media for, among other things, providing robotic system services including implementing an enhanced robotics framework. The enhanced robotics framework includes a visual feedback, a skills library, and minting and awarding a fungible token for activities associated with a robot.

BRIEF DESCRIPTION OF THE DRAWINGS

The technology described herein is described in detail below with reference to the attached drawing figures, wherein.

DETAILED DESCRIPTION

Figure 1:
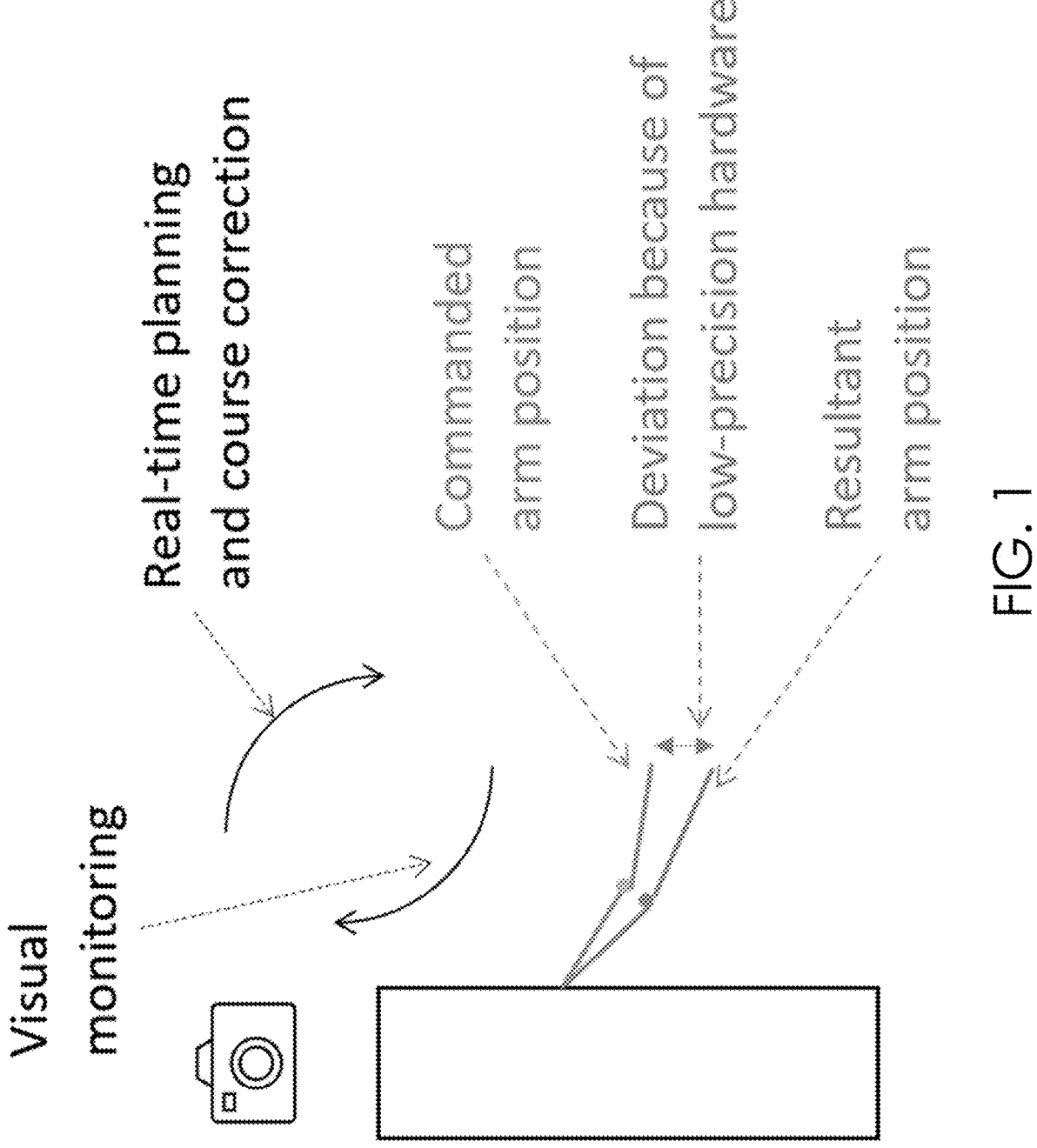
FIG. 1 is block diagram of an exemplary robotic system, in accordance with aspects of the technology described herein.

Enhanced Visual Feedback System for an Enhanced Robotic Arm

A robotic arm may be comprised of multiple joint (e.g., six or seven joints) connected in series with an end-effector at the tip of the arm. A calculation can be done to find the desired rotation of each joint, which would make the end-effector reach a specific position at a particular orientation. Many conventional robotic arms have conventional high-precision joints. The joints go the desired rotation to which they are commanded to move with high accuracy. Due to the conventional high-precision joints in conventional robotic arms, the error in the motion in each joint is small enough that the end-effector can reach within a spatial threshold (e.g., 1 mm) of the desired position.

However, the conventional high-precision build ends up being expensive. The high-precision characteristic may be achieved by using servo motors. A conventional servomotor may have built-in encoders that provide a closed feedback loop to bring the shaft to the desired position without overshooting. The mechanical construction of the conventional arm is such that there is minimal backlash. This causes the conventional arm to move synchronously with exact coupling, even for small shaft movements.

Embodiments of the present invention are directed to systems, methods, and computer storage media for, among other things, providing an enhanced joint construction for an enhanced robotic arm. The construction and/or manufacture of the enhanced robotic arm is significantly less expensive than conventional arms via sacrificing precision. The joints in the enhanced arm use brushless DC motors with external magnetic or optical encoders. The mechanical structure is simple that has high backlash. This results in lower accuracy. When the joints are commanded to move to the desired rotation, there is a slight error in each of them because of held load, gravity, and the specific configuration of the arm. The cascaded errors in the joints result in the end-effector being at a different position and orientation than desired. However, to compensate for such errors, the enhanced arm employs visual-based course correction. That is, the lack of precision in the enhanced hardware is compensated by implementing the vision-based feedback loop in software to get the arm to desired position and orientation.

The enhanced robot continuously captures the scene from its integrated color and depth camera (up to 8 times (or more) a second) while the arm moves. In each captured frame, it detects the position and the orientation of the end-effector. The robot knows the expected position and orientation that the end-effector is expected to be based on the commanded joint rotations at that moment. The shift is the difference between the expected and the actual position or orientation. The path planning algorithm continuously course corrects the arm to compensate for the shifts.

A neural network may be trained to identify the robot's end-effector. The 3-dimensional shape of the robot end-effector is also known. When the robot captures a frame during the arm motion, it may pass the image through the neural network to identify the end-effector in the image. Each of the identified pixels in the image has depth information from which its 3-dimensional position can be derived. The 3-dimensional positions of the end-effector points in the frame may be compared against the known shape of the end-effector to get the position and orientation of the end-effector at the time when the frame was captured.

There may be six (or fewer or more) joints in an arm. Each joint may have a range of rotation. The range may be broken down into discrete steps that are separated by a rotational step (e.g., 2-degrees) apart. Each joint can be in one of its discrete steps. The permutation of all the joint discrete step possibilities lists all the possible arm configurations.

The position and angle of the tip of the end-effector can be calculated from the rotation of each joint. The end-effector position and angle for each possible arm configuration may be generated. The reverse index from the end-effector position and orientation to the joint rotations may be persisted on the disk.

The robot can read the encoders on the arm joints to find the rotations of all the joints. Let's say that the current rotations are in arm configuration 'src-rot'. The robot looks up the database to find the expected end-effector position for the configuration, let's say 'src-pos'. It then detects the actual location of the end-effector in the scene, let's say 'src-real-pos'. The 'shift' in position is defined as ('src-pos'−'src-real-pos'). If the desired destination of the end-effector in the move sequence is 'dest-pos', then the arm needs to make a 'delta' move of ('dest-pos'−'src-real-pos') from the current position. From the current arm configuration 'src-rot', it finds an arm configuration 'tgt-rot' in the database, which has the end-effector position, 'tgt-pos' that is 'delta' away from 'src-pos'.

'tgt-pos'='src-pos'+'delta'

'tgt-pos'='src-pos'+('dest-pos'−'src-real-pos')

'tgt-pos'='dest-pos'+('src-pos'−'src-real-pos')

'tgt-pos'='dest-pos'+'shift'

This method of handling the shifts in the end-effector position may also done for the end-effector orientation. The discussion below is also done in terms of position but the same logic applies to.

If the arm is to be moved to a particular destination 'dest-pos', then the robot looks up the arm configurations database to find the configuration 'tgt-rot' that has end-effector position 'tgt-pos', based on the current known arm position 'shift' (see the formula in the previous section). The lookup of 'tgt-rot' is called seek. The robot then tries to find a way to move the arm from the current configuration 'src-rot' to 'tgt-rot' using a procedure called search.

The search may be done using various path finding and/or graph traversal algorithms, such as but not limited to an A* algorithm (or variant thereof). Other algorithms like RRT and PRT can also be used. The search happens in the space of arm configurations (joint rotation). A neighbor of a source joint configuration is one where each joint rotation is either the same as the src joint or plus/minus 2-degree (database step size) from the source joint configuration. The search algorithm tries to find the path of configurations from source to target where in each of the path configurations the arm is not in collision with the environment. The arm position is assumed to be shifted by the current 'shift' in each of the path configurations for collision analysis.

The robot executes the path found by the search to move the arm to the desired destination moving it from one joint configuration in the path to the next. As the arm moves the robot continuously detects the end-effector location and updates its estimate of the 'shift'. It checks the expected real position of the arm in the future configurations in the path to see if they would result in a collision with the environment. If so, it stops the path execution. It starts the new cycle for seek and search to get the arm from the current position to the desired position based on the new shift estimate.

The entire path can get executed without being stopped due to collision during path validation. At the end of the path motion, the end-effector location detection is used to determine if the end-effector has reached the desired destination. If not, the seek and search cycle is repeated from the current position to the desired destination based on the latest shift estimate. Thus this process continuously get the end-effector closer to the destination. FIG. 1 illustrates a schematic view of the enhanced visual feedback system for the enhanced robotic arm.

Enhanced Skills Library for an Enhanced Robot

The enhanced robot of the various embodiments may be a general-purpose and fast-learning robot that has a significantly decreased operation cost (e.g., a few dollars per hour) to run. It learns the skill of performing a task by observing the human demonstration of the task. The task can involve one or more objects. The objects can be manipulated by human or robot hands, and the objects can have interactions with each other.

The embodiments include enhanced user interface (UI) and/or enhanced user experience (UX)-based tools to teach a new skill to the enhanced robot instead of tasks demonstration. The enhanced robot may include a touch screen display. The user can select the objects from the frame captured by the robot camera. They can also select one of the pre-configured actions for interacting with the objects. For example, the user can select bowl and spoon objects and select scoop action. The skill can then be composed using a sequence of goals with objects and actions.

The enhanced robot may display the simulation of the action that it will take in a scene for a given learned skill. The user can correct the robot action and improve the learned skill. While the enhanced robot performs the action for the learned skill, it may also improve the skills using techniques like reinforcement learning to prefer actions that result in better results. The enhanced UI and/or enhanced UX-based tools may include an enhanced skills library.

The enhanced skills library may include similar features to an application (app) store, an app archive, an app library, and/or an app repository. The enhanced skills library may be a crowd-sourced skills library. Thus, the skills library may be a skills store.

A user of the enhanced skills library may create an account and logs in using that account while operating the robot. If the user teaches a skill to the robot, and uploads the skill (packaged in a set of computer-executable instructions, e.g., an app) the skill may be accredited to the user. If the user creates a new skill by modifying an existing skill, then the derivation chain knowledge is stored in the library. The modification of the skill can happen by changing the objects or the actions. A new skill can also be created by the composition of multiple existing skills.

Skills may be organized by categories. For example, the food services category may have food preparation and packaging skills. The library provides the ability to search for skills. A skill can have a video preview, user reviews, user ratings, and metrics like the number of tasks completed by the skill and number of downloads.

A user may download a skill from the library on the robot and start using it. The download can have a one-time fee. The skill can also charge a utility price based on the duration that it is used for. A portion of revenue from the skill purchase goes to the creator of the skill and creators of the predecessor skills in the derivation chain of the skill. The skills may be classified in tiers. The lower tiers may cost less. The robot's subscription level can also determine the tier of skills it can access. The user can choose to keep a skill taught by the user as private. The user account can have private library of such skills. Multiple robots in a deployment can collaborate on tasks. They can also use collective experiences to enhance the common skill.

Enhanced Fungible Tokens for Employment in the Enhanced Skills Library

Recent world events (e.g., global pandemics) have resulted in an increased demand for autonomous solutions to everyday problems. However, for various reasons, individuals and organizations may perceive a threat from autonomous solutions, and display opposition to the introduction of autonomous solutions (e.g., robots, domain-specific artificial intelligence (AI), and artificial general intelligence (AGI)) for problems. This perceived threat may create friction in accepting robots in the workplace and a challenge in operating them safely.

The various embodiments include a utility token that is fungible and incentivizes individuals and organizations employing various autonomous solutions, such as but not limited to conventional robots, as well as the various enhanced robots included in the embodiments. The enhanced token provides at least (1) goal achievement incentive system for robots to complete programmed tasks, (2) verified usage and performance data and reporting from AI and robotic systems, and (3) an incentive for individuals and organizations to engage and help autonomous robots (and other autonomous solutions).

As discussed, various embodiments of an enhanced robot are at least partially enabled via enhanced AI methods. Such enhanced AI methods are capable of learning skills which are defined and sequenced capabilities that achieve specific goals. For example, skills that may be encoded in an instruction set that is provided via the enhanced skills library. A non-limiting example of such a skill includes is chopping carrots or mixing salad ingredients. The embodiments include a UI for employees to train and create new skills to be stored in the skills library.

The embodiments may include a fungible and enhanced token. The enhanced token make be based on various cryptocurrency tokens, such as but not limited to a ERC-20 token. Such an enhanced token may be referred to as a $TASK token. $TASK tokens may be used to reward the AI/robot for completing verified production grade tasks. Mining and transaction histories may be used to track operations and product usage.

One measured unit for the $TASK token may be "Completed Tasks" by the enhanced robot. A Completed Task may be when the robot successfully achieves the goals defined by the skill in a production environment. In other words, simply having a robot do a skill without actually doing productive work will not meet the $TASK minting criteria. A disincentive for robot owners to have robots do non-valued tasks (for minting $TASK) is charging customers a $/hour price when using a price. If the price of $TASK is higher than the cost to use, robot owners (or operators) may go to great lengths to fool the system to generate $TASK tokens.

Figure 2:
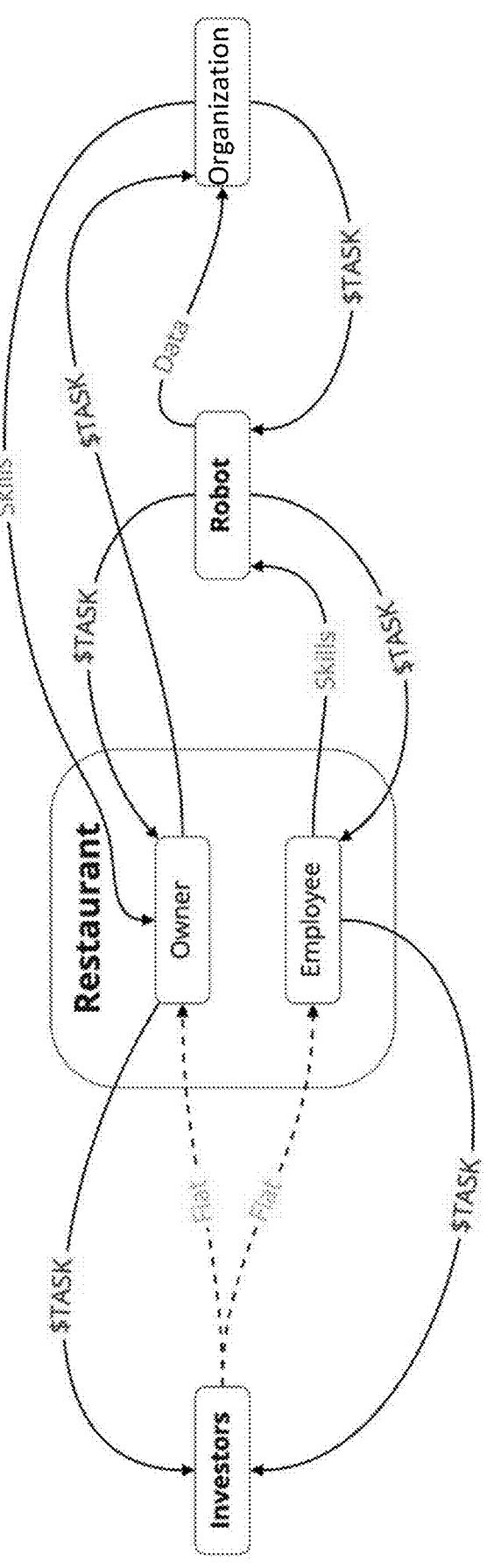
FIG. 2 is block diagram of an exemplary robotic system, in accordance with aspects of the technology described herein.

Tracking $TASK token activity may be helpful in tracking overall system health and performance. Various embodiments may employ token activity as leading indicators on performance outages. FIG. 2 illustrates a robot and an organization serving as nodes for mining $TASK tokens. Robots may mine tokens upon successful completion of production grade tasks. Individuals and/or organizations may receive tokens for training robots with new skills. Skills can be deployed to other robots and pay royalties based on usage. Individuals and/or organizations may mine tokens by processing transactions on the block chain.

In FIG. 2, tokens may be traded by investors, individuals, and/or organizations. Tokens may be used to (1) access new skills, (2) purchase robots, (3) purchase derivative tokens (e.g., non-fungible tokens (NFTs)), and the like. Various strategies may be employed to minimize (or at least decrease) the effects of bad actors attempting to mine $Task tokens without doing real work. Such strategies may include, but are not limited to (a) bonding curve for tokens, (b) charging a fee (e.g., charging for "gas") to complete transactions, (c) charging users a usage fee (e.g., a $/hour fee) to use a robot, and the like. In situations where there is a chance that the price of an $TASK token is higher than the cost to run a robot to complete a task (c), monitoring tools may be employed to ensure that individuals and/or organizations do not take advantage of this arbitrage opportunity.

Example Methods

Figure 3:
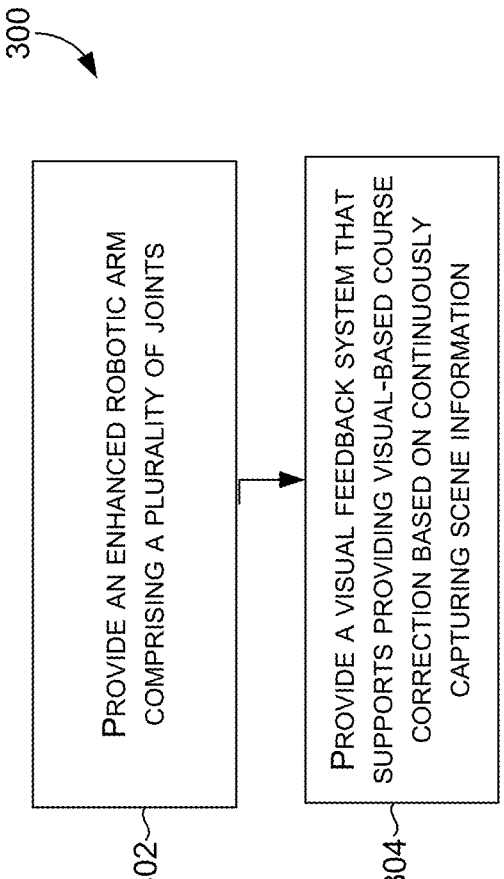
FIG. 3 provides a first exemplary method associated with the robotic system, in accordance with aspects of the technology described herein.
Figure 4:
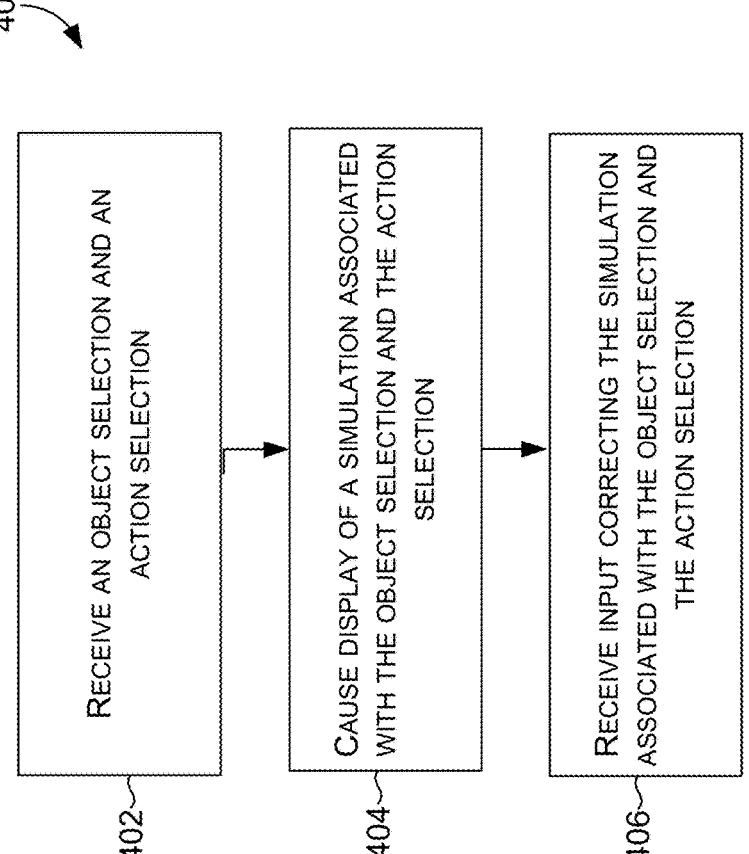
FIG. 4 provides a second exemplary method associated with the robotic system, in accordance with aspects of the technology described herein.
Figure 5:
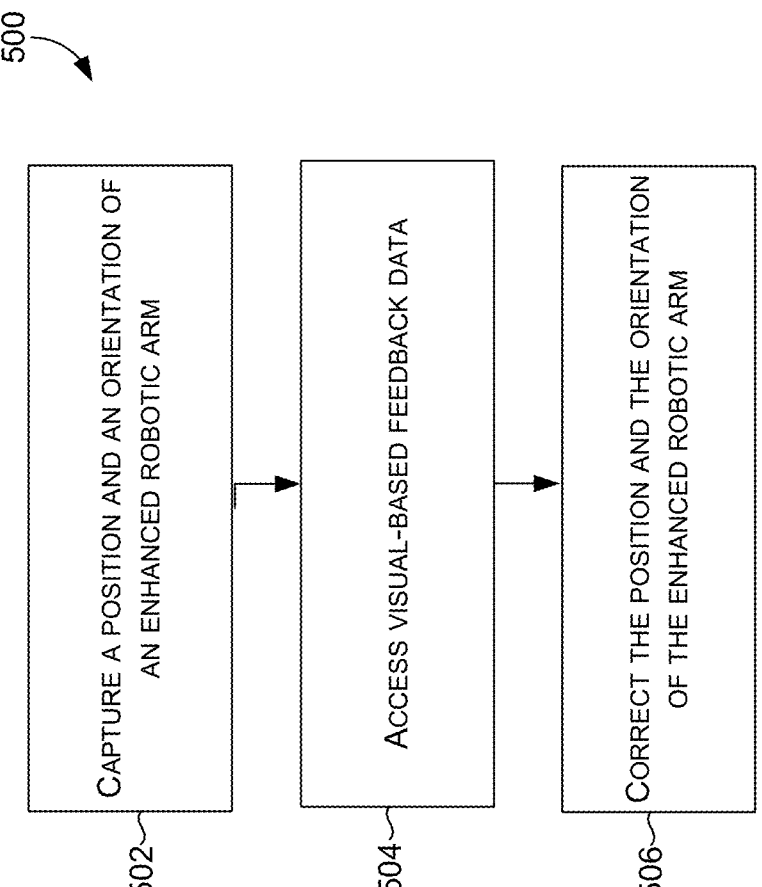
FIG. 5 provides a third exemplary method associated with the robotic system, in accordance with aspects of the technology described herein.
Figure 6:
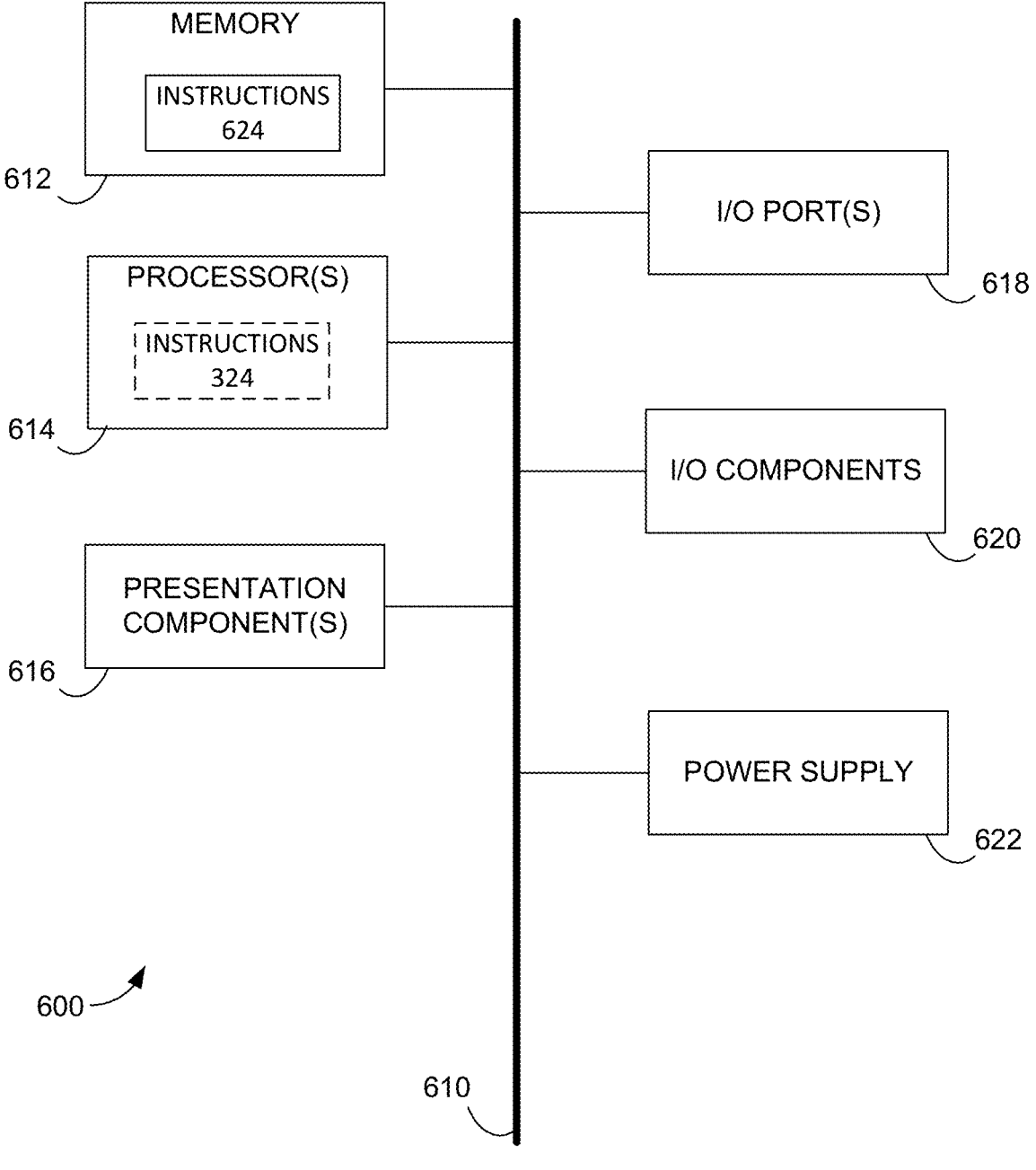
FIG. 6 is a block diagram of an exemplary computing environment suitable for use in implementing aspects of the technology described herein.

With reference to FIGS. 3, 4, and 5, flow diagrams are provided illustrating methods for providing robotic system services including implementing an enhanced robotics framework. The enhanced robotics framework includes a visual feedback, a skills library, and minting and awarding a fungible token for activities associated with a robot. In embodiments, one or more computer-storage media having computer-executable or computer-useable instructions embodied thereon that, when executed, by one or more processors can cause the one or more processors to perform the methods (e.g., computer-implemented method) in the security management system (e.g., a computerized system or computing system).

Turning to FIG. 3, a flow diagram is provided that illustrates a method 300 for providing robotic system services including implementing an enhanced robotics framework. At block 302, provide an enhanced robotic arm comprising a plurality of joints. At block 304, provide a visual feedback system that supports providing visual-based course correction based on continuously capturing scene information.

Turning to FIG. 4, a flow diagram is provided that illustrates a method 400 for providing robotic system services including implementing an enhanced robotics framework. At block 402, receive an object selection and an action selection. At block 404, cause display of a simulation associated with the object selection and the action selection. At block 406, receive input correcting the simulation associated with object selection and the action selection.

Turning to FIG. 5, a flow diagram is provided that illustrates a method 500 for providing robotic system services including implementing an enhanced robotics framework. At block 502, capture a position and an orientation of an enhanced robotic arm. At block 504, access visual-based feedback data. At block 506, correct the position and the orientation of the enhanced robotic arm.

Illustrative Computing Device

Having described embodiments of the present invention, an example operating environment in which embodiments of the present invention may be implemented is described below in order to provide a general context for various aspects of the present invention. Referring to FIG. 3, an illustrative operating environment for implementing embodiments of the present invention is shown and designated generally as computing device 300. Computing device 300 is but one example of a suitable computing environment and is not intended to suggest any limitation as to the scope of use or functionality of the invention. Neither should the computing device 300 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 3, computing device 300 includes a bus 310 that directly or indirectly couples the following devices: memory 312, one or more processors 314, one or more presentation components 316, input/output ports 318, input/output components 320, and an illustrative power supply 322. Bus 310 represents what may be one or more busses (such as an address bus, data bus, or combination thereof). Although the various blocks of FIG. 3 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 3 is merely illustrative of an example computing device that can be used in connection with one or more embodiments of the present disclosure. Distinction is not made between such categories as "workstation," "server," "laptop," "hand-held device," etc., as all are contemplated within the scope of FIG. 3 and reference to "computing device."

Computing device 300 typically includes a variety of computer-readable media. Computer-readable media can be any available media that can be accessed by computing device 300 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 300. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 312 includes computer storage media in the form of volatile and/or nonvolatile memory. Memory 312 may be non-transitory memory. As depicted, memory 312 includes instructions 324. Instructions 324, when executed by processor(s) 314 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 300 includes one or more processors that read data from various entities such as memory 312 or I/O components 320. Presentation component(s) 316 present data indications to a user or other device. Illustrative presentation components include a display device, speaker, printing component, vibrating component, etc.

I/O ports 318 allow computing device 300 to be logically coupled to other devices including I/O components 320, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A robotic system, the robotic system comprising:
a processor device; and
a computer-readable storage medium, coupled with the processor device, having instructions stored thereon, which, when executed by the processor device, perform actions comprising controlling a robotic arm to move an end effector of the robotic arm through a path comprising desired positions and orientations;
the robotic arm comprising a plurality of joints, wherein the plurality of joints are associated with one or more brushless direct current (DC) motors, the one or more brushless DC motors comprising an encoder; and
a visual feedback system that supports providing visual-based course correction by:
continuously capturing scene information via a camera;
determining actual positions and orientations of the end effector of the robotic arm based on the scene information captured via the camera as the robotic arm moves the end effector through the path; and
as the robotic arm moves the end effector through the path, updating the control of the robotic arm based on comparisons of the desired positions and orientations with the actual positions and orientations.

2. The robotic system of claim 1, wherein the encoder is an external magnetic encoder or an optical encoder.

3. The robotic system of claim 1, wherein the scene information is captured independent from integrated color via a depth camera.

4. The robotic system of claim 1, wherein the scene information is captured as frames, wherein for each capture frame a position and an orientation of the robotic arm is captured relative to the end effector.

5. The robotic system of claim 1, further comprising a path planning algorithm that supports continuous course correction of the robotic arm to compensate for shifts.

6. The robotic system of claim 1, wherein the visual feedback system operates to compensate for a lack of precision in movements of the plurality of joints based on implementing a vision-based feedback loop.

7. The robotic system of claim 1, wherein the visual feedback system operates to correct an actual position and orientation of the end effector to a desired position and orientation.

8. The robotic system of claim 1, the actions comprising generating an error associated with held load, gravity, and a configuration associated with the robotic arm.

9. The robotic system of claim 1, the actions comprising generating a plurality of cascading errors associated with the plurality of joints.

10. One or more non-transitory computer-storage media having computer-executable instructions embodied thereon that, when executed by a computing system having a processor and memory, cause the processor to perform operations, the operations comprising:
controlling a robotic arm to move an end effector of the robotic arm through a path comprising desired positions and orientations, the robotic arm comprising a plurality of joints, wherein the plurality of joints are associated with one or more brushless direct current (DC) motors, the one or more brushless DC motors comprising an encoder;
continuously capturing scene information via a camera;
determining actual positions and orientations of the end effector of the robotic arm based on the scene information captured via the camera as the robotic arm moves the end effector through the path; and
as the robotic arm moves the end effector through the path, updating control of the robotic arm based on comparisons of the desired positions and orientations with the actual positions and orientations.

11. The one or more non-transitory computer-storage media of claim 10, wherein the scene information is captured independent from integrated color via a depth camera.

12. The one or more non-transitory computer-storage media of claim 10, wherein the scene information is captured as frames, wherein for each capture frame a position and an orientation of the robotic arm is captured relative to the end effector.

13. The one or more non-transitory computer-storage media of claim 10, further comprising a path planning algorithm that supports continuous course correction of the robotic arm to compensate for shifts.

14. A method, the method comprising:
controlling a robotic arm to move an end effector of the robotic arm through a path comprising a plurality of a desired positions and orientations, the robotic arm comprising a plurality of joints, wherein the plurality of joints are associated with one or more brushless direct current (DC) motors, the one or more brushless DC motors comprising an encoder;
accessing visual-based feedback data via a camera; and
based on the visual-based feedback data, correcting control of the robotic arm by:
determining actual positions and orientations of the end effector of the robotic arm based on scene information captured via the camera as the robotic arm moves the end effector through the path; and
as the robotic arm moves the end effector through the path, updating the control of the robotic arm based on comparisons of the desired positions and orientations with the actual positions and orientations.

15. The method of claim 14, comprising capturing position and orientation of the robotic arm by capturing the scene information independently from integrated color via a depth camera.

16. The method of claim 14, wherein the scene information is captured as frames, wherein for each capture frame a position and an orientation of the robotic arm is captured relative to the end effector.

17. The method of claim 14, wherein the visual-based feedback data comprises an error associated with held load, gravity, and a configuration associated with the robotic arm.

18. The method of claim 14, wherein the visual-based feedback data comprises a plurality of cascading errors in the plurality of joints, the plurality of cascading errors result in the end effector being at a different position and orientation than desired.

* * * * *